May 9, 1933.                C. G. JANSON                1,907,823
                            RADIAL BEARING
                          Filed July 1, 1930
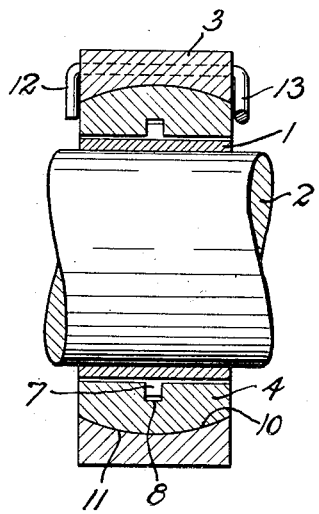
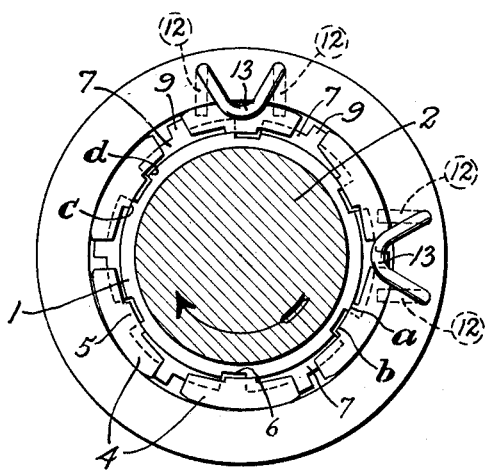
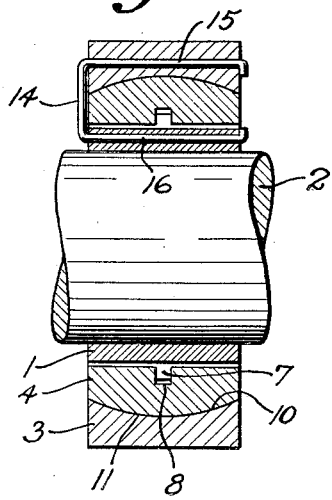
INVENTOR
Carl Gustaf Janson
BY
his ATTORNEY Patented May 9, 1933

1,907,823

UNITED STATES PATENT OFFICE

CARL GUSTAF JANSON, OF STOCKHOLM, SWEDEN, ASSIGNOR TO AKTIEBOLAGET NOMY, OF STOCKHOLM, SWEDEN, A CORPORATION OF SWEDEN

RADIAL BEARING

Application filed July 1, 1930, Serial No. 465,078, and in Sweden July 6, 1929.

The present invention relates to radial bearings. More specifically it relates to bearings of the type disclosed in the copending application of August Gunnar Ferdinand Wallgren, Serial No. 277,769, which has matured into Patent No. 1,871,485, granted August 16, 1932, in which a plurality of bearing blocks, radially disposed between an inner bearing member and an annular outer member or race, are arranged to tilt with respect to one of the members when the bearing is in operation to form wedge-shaped spaces for the reception of a film of load-sustaining lubricant. Still more specifically the invention relates to radial bearings of the above type made in the form of separate units having an annular inner member adapted to be mounted on a shaft or the like.

The principal object of the invention is to provide means for retaining the bearing blocks in their proper position with respect to the bearing members and for preventing disassembly of the bearing units before they are mounted in the position in which they are intended to operate. Further objects and the manner in which the invention may be carried into effect are more fully disclosed in the following description of the forms of apparatus illustrated in the accompanying drawing forming a part of this specification.

In the drawing:

Fig. 1 is a longitudinal central section of a bearing embodying the invention;

Fig. 2 is an elevation of the bearing shown in Fig. 1, looking from the right; and Fig. 3 is a view similar to Fig. 1 showing another form of the invention.

Referring now to the drawing, 1 designates an inner bearing member which in the present instance is in the form of a ring adapted to be mounted on the shaft 2. Radially spaced from ring 1 is the outer bearing member or race 3 adapted to be fixed in a casing or the like. A plurality of bearing blocks 4 are disposed radially between ring 1 and race 3, the inner face of each of the blocks being provided with a projection 5 forming bearing surfaces $a$ and $b$. Ring 1 is provided with a plurality of notches 6, the shoulders thereof forming bearing surfaces $c$ and $d$. The surfaces $a$ of the blocks are adapted to engage the shoulders $c$ when shaft 2 and ring 1 rotate with respect to race 3 in the direction of the arrow in Fig. 2, and by reference to this figure it will be seen that the blocks 4 will be caused to tilt peripherally with respect to the race 3 due to the fact that the cooperating bearing surfaces are peripherally to one side of the centers of the blocks. Upon rotation of shaft 2 and ring 1 in the opposite direction the blocks shift peripherally so that surfaces $b$ and $d$ engage to cause tilting of the blocks in the opposite direction.

Ring 1 is further provided with a series of segmental peripherally disposed flanges 7 extending into peripheral grooves 8 in the blocks to prevent axial displacement of the blocks with respect to the ring, and each flange 7 has a radially extending boss 9 thereon. The bosses 9 act to limit peripheral movement of the blocks, but are so spaced as to permit the above described peripheral shifting of the blocks. They also act as driving abutments causing rotation of the blocks with the ring 1, which may be termed the driving member of the bearing.

The outer faces of blocks 4 form bearing surfaces 10 adapted to slide with respect to the cooperating bearing surface 11 formed by the inner face of ring 3, and the tilted position assumed by the blocks when the bearing is in operation provide a wedge-shaped space between each of the surfaces 10 and the surface 11 which permits the formation of a load-sustaining film of lubricant between the load transmitting blocks and the outer race.

In order to render the bearing self aligning, surfaces 10 and 11 are spherically curved, this curvature also serving to assist in retaining the lubricant in the bearing. For a more detailed disclosure of the above described structure reference may be had to the copending application above referred to.

By reference to Fig. 1 it will be seen that with the members 1 and 3 in a common plane, as shown in the figure, the blocks are held radially and axially in position between these members. Because, however, of the spherically curved surfaces 10 and 11 the position of the members can be shifted so that one or more of the blocks 4 move out of engagement with the race 3, in which event the block or blocks will fall out of position. The same also holds true in the case of bearings having cylindrically curved surfaces 10 and 11, if the ring 1 is moved axially a sufficient distance with respect to race 3.

In accordance with the present invention, this possibility of disassembly of the bearing unit, due to relative displacement of parts, is prevented by providing means for limiting the displacement of ring 1 and its associated blocks 4 with respect to the race 3.

In the form shown in Figs. 1 and 2 this means comprises a plurality of wire clips 12 in the form of staples the legs of which pass through suitable axial holes in the race 3, both ends of the staples being bent radially inwardly as at 13, so as to limit axial displacement of the blocks 4 with respect to the race 3. With movement of blocks 4 thus restricted the entire bearing is held together as a unit, since axial displacement of the driving ring is prevented by the flanges 7 in grooves 8. After the bearing unit has been installed, with the race 3 secured in a casing or the like the clips 12 may be removed or they may be permitted to remain in place. If the clips 12 are intended to be left in position during operation of the bearing, the axial distance between the inturned ends 13 should be sufficient to provide clearance for permitting the bearing to align itself.

Another form of means for holding the bearing parts in assembled position is shown in Fig. 3. This form is intended only for use until the bearing unit is installed in operative position, and comprises one or more U-shaped clips 14 connecting the bearing members 1 and 3. In the example illustrated, each clip has a leg 15 passing axially through the race 3 and a leg 16 passing axially through the driving ring 1, the ends of these legs being bent over to hold the clip in position. Obviously clips 14 must be removed or broken before the bearing can operate.

While preferred forms of the invention have been illustrated by way of example, the invention may obviously be carried out by means of other forms of apparatus which will occur to those skilled in the art. The invention is therefore to be understood as not limited to the forms shown, but is to be considered as including all such changes and variations as may fall within the scope of the appended claims.

What I claim is:

1. A bearing of the radial type comprising an inner bearing member, an outer bearing member, a plurality of bearing blocks having operative positions radially between said members, one of said members and said blocks having cooperating surfaces adapted to slide with respect to each other, said blocks being adapted to move with the other of said members and said surfaces permitting movement of the blocks to positions out of contact with said one member and means adapted to contact relatively movable parts of the bearing for restraining the blocks against movement from between said members.

2. A bearing of the radial type comprising an inner bearing member, an outer bearing member, a plurality of bearing blocks having operative positions radially between said members, the outer member and said blocks having cooperating surfaces adapted to slide with respect to each other, said blocks being adapted to move with the inner member and said surfaces permitting movement of the blocks to positions out of contact with said outer member and means secured to one of said members and adapted to contact a part of the bearing relatively movable with respect thereto for restraining the blocks against movement from between said members.

3. A bearing of the radial type comprising inner and outer bearing members, a plurality of bearing blocks having operative positions radially between said members, one of said members and said blocks having cooperating surfaces for preventing axial displacement of the blocks with respect to said one member when the blocks are in operative position and the other of said members and said blocks having cooperating surfaces adapted to slide with respect to each other, said last named surfaces permitting movement of the blocks to positions out of contact with said other member, and means associated with one of said members for limiting axial displacement of said blocks relative to the member with respect to which they are adapted to slide.

4. A bearing of the radial type comprising inner and outer bearing members, a plurality of bearing blocks having operative positions radially between said members, one of said members and said blocks having cooperating surfaces for preventing axial displacement of the blocks with respect to said member when the blocks are in operative position, and a plurality of clips engaging the other of said members, said clips having portions positioned to limit the axial movement of said blocks with respect to said last mentioned member.

5. A bearing of the radial type comprising an inner bearing member, an outer bearing member, a plurality of bearing blocks having operative positions radially between said members, said inner member having a series of abutments for causing rotation of said blocks with said inner member and a series of projections for preventing axial movement of said blocks with respect to said inner member when said blocks are in operative position, said blocks and said outer member having curved bearing surfaces adapted to permit axial displacement of the inner member with respect to the outer member with the blocks in operative position, and means for limiting the relative displacement of said members to maintain said blocks radially between said members.

6. A bearing of the self-aligning radial type comprising an inner bearing member, an outer bearing member, a plurality of bearing blocks having operative positions radially between said members, said inner member having a series of abutments for causing rotation of said blocks with said inner member and a series of projections for preventing axial movement of said blocks with respect to said inner member when said blocks are in operative position, said blocks and said outer member having spherically curved bearing surfaces adapted to permit displacement of the inner member with respect to the outer member with the blocks in operative position, and means for limiting the relative displacement of said members to maintain said blocks radially between said members.

7. A bearing of the radial type comprising an inner bearing member, an outer bearing member, a plurality of bearing blocks having operative positions radially between said members, said inner member having irregular projecting portions for causing rotation of the blocks with the inner member and for preventing axial displacement of the blocks with respect to said inner member, and a clip having portions engaging said outer member and radially inturned portions adapted to contact said blocks to limit the axial movement of the blocks with respect to the outer member to maintain them radially between said members.

8. A bearing of the radial type comprising an inner bearing member, an outer bearing member, a plurality of bearing blocks having operative positions radially between said members, said inner member having irregular projecting portions for causing rotation of the blocks with the inner member and for preventing axial displacement of the blocks with respect to said inner member, and a clip for connecting said inner and outer bearing members to prevent axial displacement thereof with respect to each other.

In testimony whereof I have affixed my signature.

CARL GUSTAF JANSON.